Figure 1:
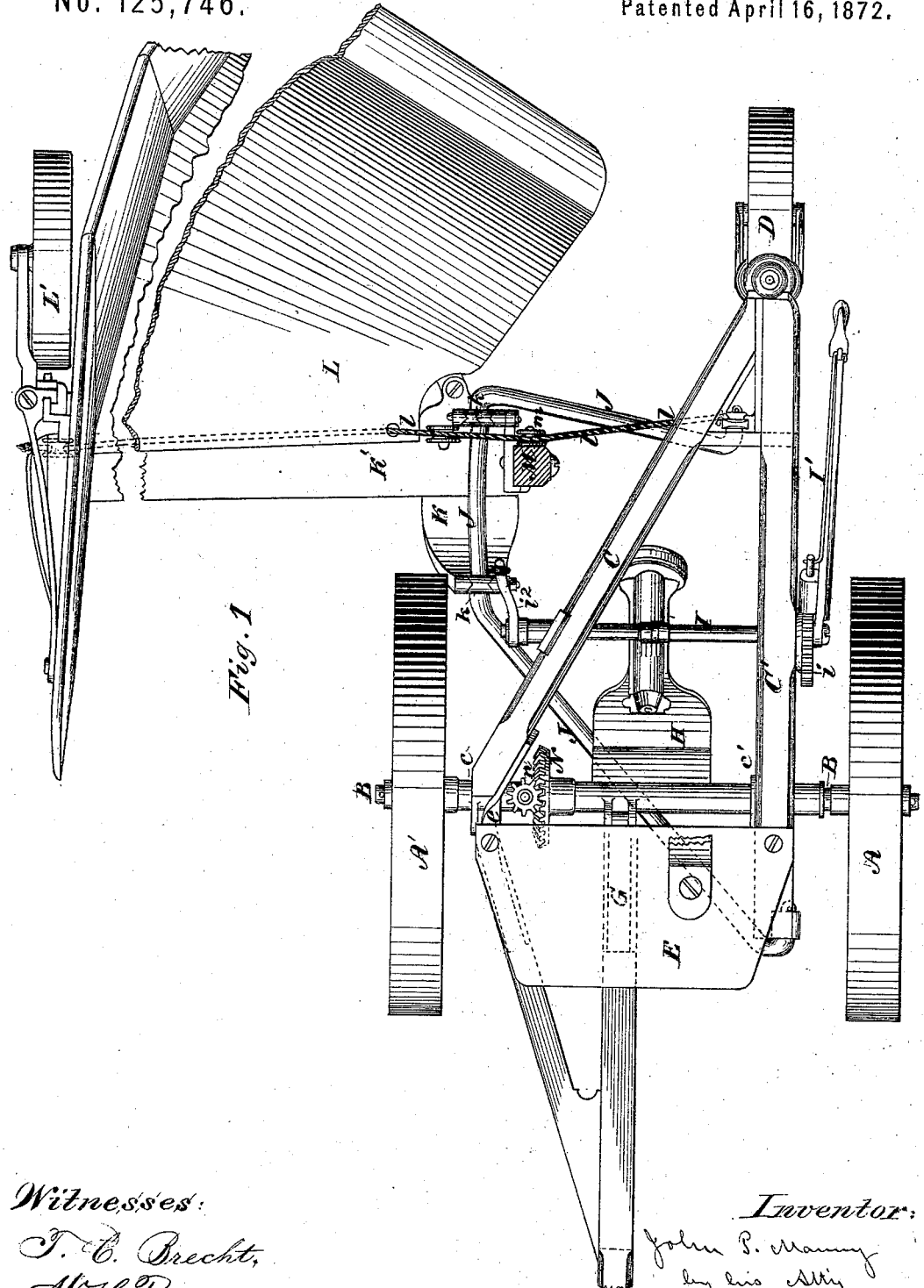

JOHN P. MANNY.
Improvement in Harvesters.

No. 125,746.   
Patented April 16, 1872.

3 Sheets--Sheet 1.

Witnesses:  
T. C. Brecht  
W. H. Rowe

Inventor:  
John P. Manny  
by his Atty  
W. D. Baldwin

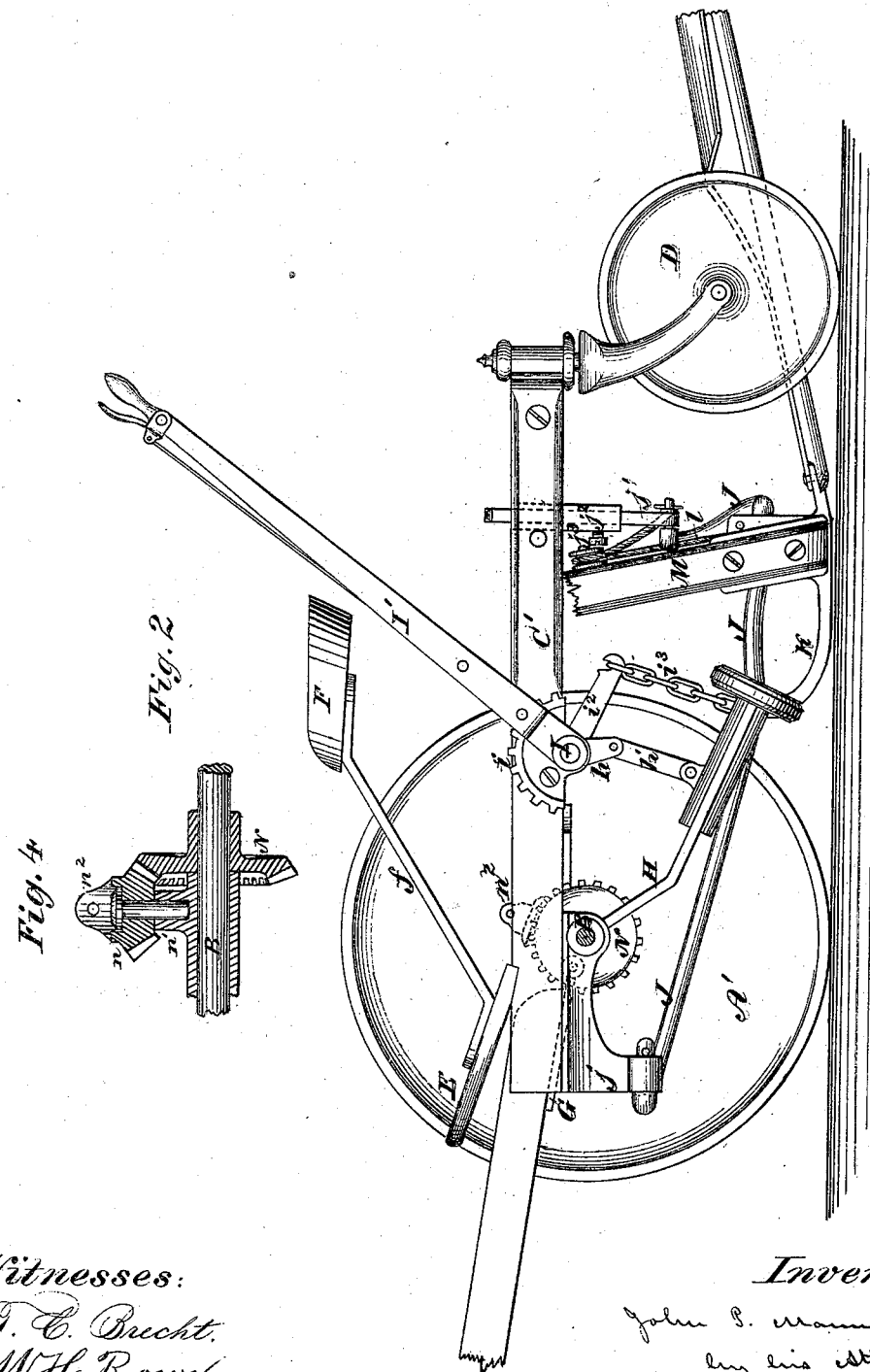

JOHN P. MANNY.
Improvement in Harvesters.
No. 125,746. Patented April 16, 1872.
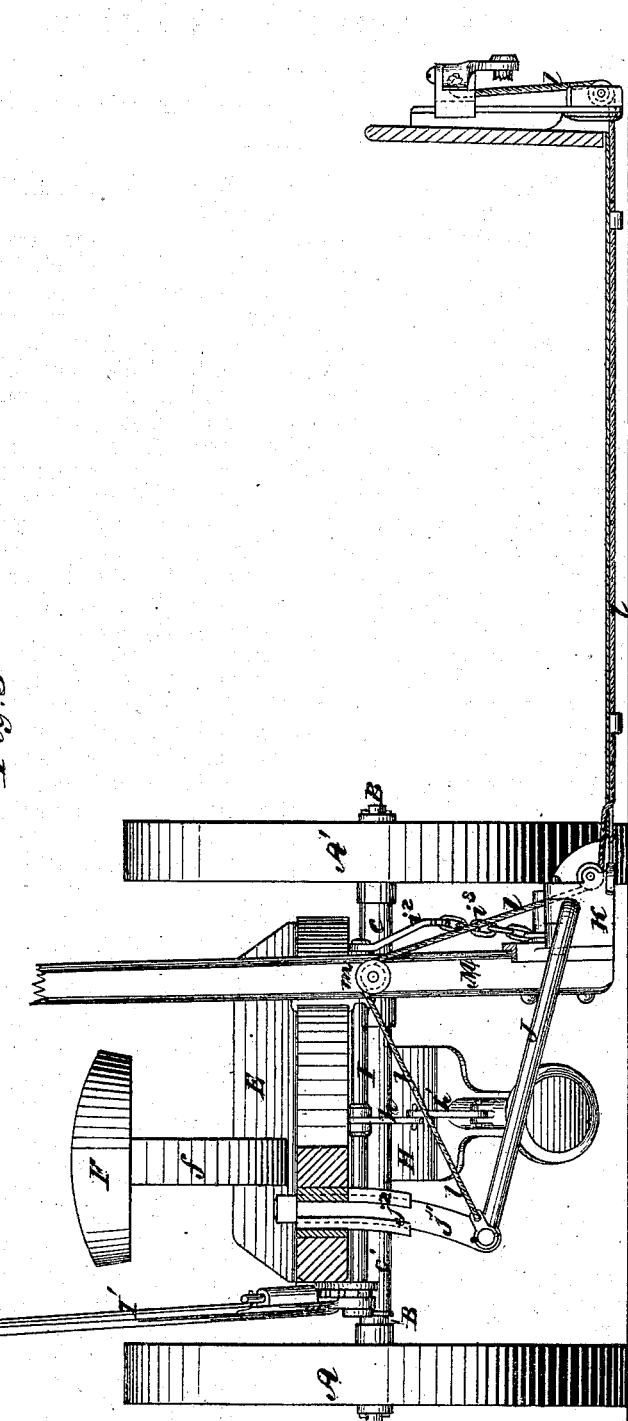

125,746

UNITED STATES PATENT OFFICE.

JOHN P. MANNY, OF ROCKFORD, ILLINOIS.

IMPROVEMENT IN HARVESTERS.

Specification forming part of Letters Patent No. 125,746, dated April 16, 1872.

*To all whom it may concern:*

Be it known that I, JOHN P. MANNY, of Rockford, Illinois, have invented certain new and useful Improvements in Harvesters, of which the following is a specification, reference being had to the accompanying drawing, which represents all my improvements embodied in one machine in the way now best known to me. Some of these improvements obviously, however, may be used without the others, and the details of construction of the mechanism may be varied to some extent without departing from the spirit of my invention.

My improvements are to be used upon a fully-organized harvester, but the drawing shows so much only of the machine as is necessary to illustrate the invention herein claimed. My invention relates more especially to improvements on the machine for which Letters Patent of the United States were granted to me July 14, 1857, although many of them are readily applicable to machines of a construction different from that shown in said patent.

In the accompanying drawing, Figure 1 represents a plan or top view of my improved machine; Fig. 2, a side elevation thereof; Fig. 3, a rear elevation thereof; and Fig. 4, a detached view of the gear-wheels for driving the reel, as hereinafter more fully described.

My machine is intended to be used as a mower, a dropper, a hand-raker, or a self-raking reaper. I will first proceed to describe the parts common to all these purposes, and then indicate those designed for each special purpose; the subject-matter herein claimed being clearly set forth hereinafter.

Two driving-wheels, A A', turn loosely on an axle, B, with which they are connected by suitable backing-ratchets. The main frame is shown as composed of two beams, C C', supported in front on the main axle, and in the rear by a caster-wheel, D. The frame-timbers are so arranged as to form two sides of a triangle, of which the main axle forms the third, the apex being the point to which the caster-wheel is pivoted. The frame-piece C', on the stubble side of the machine, lies at right angles to the axle, and projects slightly beyond it, while the inner timber C forms an angle therewith. This arrangement leaves a space behind the inner driving-wheel, in which I locate much of the mechanism, as hereinafter explained.

The frame-pieces are attached to the axle by collars $c$ $c^1$, which turn freely thereon. A foot-board, E, is secured upon the front projection of the frame-timber C, and upon an arm, $e$, secured to the angular frame-timber C'. This foot-board is inclined upward and forward at a slight angle to the frame, as shown in Fig. 2, for a purpose hereinafter explained. A seat, F, for the driver, is mounted on an arm, $f$, secured upon this foot-board and inclined backward and upward, so as to bring the seat nearly centrally between the three wheels, on which the main frame rests. The hounds G of the tongue are pivoted to collars on the main axle. The foot-board E acts as a stop to limit the rising of the rear end of the frame by striking the tongue, as hereinafter explained. A gearing-frame, H, is pivoted at its forward end upon the main axle. This frame is supported and raised or lowered by means of a rock-shaft, I, having its bearing upon the main frame. The shaft is rocked by means of a hand-lever, I', and a spring-detent taking into a sector-rack, $i$, on the frame. This lever is arranged on the stubble side of the machine instead of on the grain side, as usual. A crank, $h$, on the rock-shaft is pivoted to the gearing-frame by means of an intermediate link, $h'$, arranged centrally beneath the frame. The coupling-frame J, in this instance, and by preference, is composed of a strong bar or rod bent into a shape substantially triangular. The front end of this frame is pivoted to a down-hanger, $j$, secured underneath the frame-timber C' in front of the axle, while its rear end is correspondingly pivoted to an adjustable slide, $j^1$, moving in a guide, $j^2$, in the frame. A set-screw, $j^3$, locks this slide in position; but I propose, in practice, to use a lever and detent for the purpose of adjusting this slide. This slide is curved, and works in a guide, curved as shown in Fig. 3, so as to raise and lower the rear end of the coupling-frame without disturbing the coincidence of the joints of the finger-beam and pitman, as hereinafter explained. A crank-arm, $i^2$, on the rock-shaft I is connected with the coupling-frame by means of a chain, $i^3$, to raise or lower the frame. A shoe, K, is pivoted on this coupling-frame at its inner rear angle, the frame being slightly arched above the shoe, as shown in Fig. 2, to allow the pitman to pass between it and the shoe. I cast the shoe with open slots in its heel and toe, one-half of the box in which the frame rests being formed in these slots. The upper parts of these boxes are formed by blocks $k$, which fit in the slots above the frame, and are held by pins or screws passing transversely through them. By this mode of construction the parts easily can be connected or disconnected. A finger-beam, K', is secured to the shoe in the usual way. The machine thus far described, when supplied with suitable gearing and a cutting apparatus, is fully organized for mowing.

To adapt the machine for use as a hand-raking reaper, a platform, L, is attached to the finger-beam in any well-known way. A grain-wheel, L', is attached to the divider-end of the finger-beam, in a way shown in patents heretofore granted to me. A cord or chain, $l$, attached to the arm of this wheel, and extending to the gearing side of the machine, serves to support and adjust the divider-end of the platform. A dropping-platform of the usual well-known construction may be substituted for the platform above described, when desired.

When used as a hand-raker or dropper, a seat may be placed over the caster-wheel, upon which seat the raker may ride, his feet resting on a foot-board secured to the coupling-frame.

I extend the heel-end of the shoe inside of the coupling-frame, and mount a post, M, thereon. The cord $l$ above mentioned passes over a pulley, $m$, on this post, and is secured to the rear pivot of the coupling-frame; consequently, when the coupling-frame is lifted, the divider-end of the finger-beam is also lifted. A bevel-wheel, N, fast on the main axle drives a corresponding pinion, $n$, on a stud, $n^1$, on the sleeve, in which the main axle turns. A coupling, $n^2$, drives the rake-shaft by suitable connections, unnecessary here to describe, being well known. This forms a strong, simple, cheap, and effective mode of driving the reel or rake. A reel constructed and operated in the usual way may be mounted on the post M. The post M is located behind and inside of the inner driving-wheel A' in the space left by the angular arrangement of the inner frame-timber C', hereinbefore described.

My improved machine is readily adaptable to any of the automatic rakes recently patented by me. I have also designed one specially for use on this machine, but it forms the subject-matter of a separate application for Letters Patent, filed simultaneously herewith, and need not therefore be here described.

When operating as a mower, the platform, reel, rake, grain-wheel, and lifting-chain $l$ are removed. The shoe ordinarily runs upon the ground, rising and falling to conform to inequalities over which it slides. The coupling-frame vibrates independently of the gear-frame, the latter being suspended by its link $h'$ from the main frame. The coupling-frame is raised or lowered by its crank-arm and chain. When the coupling-frame is lifted by means of the hand-lever, the first upward movement of the crank-arm tends to lift the cutter-bar end of the pitman higher than the crank end, thereby compensating the radial movement of the coupling-frame on its pivots. The relation of the crank-arm $h$ which lifts the gear-frame relatively to the crank-arm which lifts the coupling-frame is such that the former does not begin to lift the gear-frame until the latter has risen some distance, as above explained, thus allowing for the compensatory movement of the pitman and coupling-frame above explained.

The guard-fingers are set at any proper angle desired by adjusting the slide in its guide. This guide is so curved as to bring the rear pivot of the coupling-frame as it rises nearer the grain side of the machine, thus maintaining the proper relation of the joints of the shoe to the pitman-joint.

I find, in practice, that when an obstruction is suddenly met, the hinder end of the machine tends to rise, and might, under some circumstances, throw the driver from his seat. This I prevent by the arrangement of the foot-board to act as a stop to prevent the rise of the rear end of the machine beyond a safe distance by striking the tongue. I secure by my improvements perfect flexibility of the cutting apparatus, while allowing each frame to move, to some extent, independently of the others, and also relieve the necks of the horses from strain.

In harvesting, the parts above mentioned as being removed are replaced, and the cutting apparatus is adjusted and held at the desired height from the ground. As the cutting apparatus is raised the lifting-chain $l$ raises the divider-end of the finger-beam by drawing down the arm of the grain-wheel, this drawing being done by the rising of the pulley $m$ above the rear joint of the coupling-frame, to which the lifting-chain is secured.

I claim as my invention—

1. The combination of the driving-wheels, caster-wheel, main frame, hinged tongue, and foot-board, substantially as set forth, whereby the foot-board acts as a stop to limit the rising of the rear end of the main frame.

2. The coupling-frame, constructed, as described, of a continuous rod pivoted on the stubble side of the main frame, sloping diagonally backward across the main and gearing frames, and passing through lugs on the shoe, for the purposes set forth.

3. The combination of the triangular main frame, its supporting-wheels, the coupling-frame vibrating at right angles to the main axle, the rock-shaft extending across the frame, and the lifting crank and chain, all these members being constructed and operating as described.

4. The combination of the rear end of the coupling-frame with the vertically-adjustable link and its guide, as set forth, to adjust the angle of the guards, and to preserve the proper relation of the joints of the shoe and pitman.

5. The combination of the gear-frame pivoted on the main axle with the coupling-frame surrounding the gear-frame, and independently pivoted transversely thereto, substantially as set forth.

6. The combination of the main and gear frames, vibrating independently of each other, with the coupling-frame pivoted to the main frame, these members being constructed and operating substantially as set forth.

7. The combination of the main frame, gear-frame, coupling-frame, lifting devices, and shoe, substantially as set forth, whereby compensation is made in raising or lowering the cutting apparatus for the eccentricity of movement of the shoe and gear-frame, and the joints of the shoe and pitman are kept substantially coincident.

8. The combination, with the vibrating coupling-frame, of the reel-post mounted on the shoe inside of the coupling-frame, substantially as set forth.

9. The combination of the main frame, coupling-frame, lifting devices, finger-beam, grain-wheel, and cord connecting the grain-wheel and frame, and passing over a pulley on the reel-post, substantially as set forth, to lift both ends of the finger-beam simultaneously.

10. The combination of the triangular main frame, its supporting-wheels, the coupling-frame, shoe, and reel-post, substantially as set forth, whereby the reel-support is brought between and behind the driving-wheels and inside the coupling-frame, as set forth.

In testimony whereof I have hereunto subscribed my name.

JOHN P. MANNY.

Witnesses:
  BALTIS DE LONG,
  EDWD. C. DAVIDSON.